April 15, 1958 A. J. W. M. VAN OVERBEEK 2,831,114

TRANSISTOR AMPLIFIER WITH BIAS STABILIZATION

Filed Oct. 27, 1955

INVENTOR
ADRIANUS JOHANNES WILHELMUS MARIE VAN OVERBEEK
BY
Fred M. Vogel
AGENT

United States Patent Office 2,831,114
Patented Apr. 15, 1958

2,831,114

TRANSISTOR AMPLIFIER WITH BIAS STABILIZATION

Adrianus Johannes Wilhelmus Marie van Overbeek, Eindhoven, Netherlands, assignor, by mesne assignments, to North American Philips Company, Inc., New York, N. Y., a corporation of Delaware Application October 27, 1955, Serial No. 543,179

Claims priority, application Germany November 25, 1954

4 Claims. (Cl. 250—36)

The present invention relates to transistor amplifiers. More particularly, the invention relates to transistor amplifiers having bias stabilization by means of a temperature-dependent resistor which is included in the base circuit and of which one end is connected to one terminal and the other end is connected via another resistor to the other terminal of the source of supply for the transistor. The object of the invention is to provide stabilization with the use of a minimum number of circuit elements, and in accordance with the present invention, the junction of the two resistors is connected via a source of signals to be amplified to the base and also connected via a capacitor passing the signal frequencies to the emitter of the transistor. A load on the amplifier which constitutes a considerable impedance for both the signal frequencies and direct current is included between the emitter and the associated terminal of the source of supply.

In order that the invention may be readily carried into effect, it will now be described, by way of example, with reference to the accompanying drawing, in which.

Figure 1:
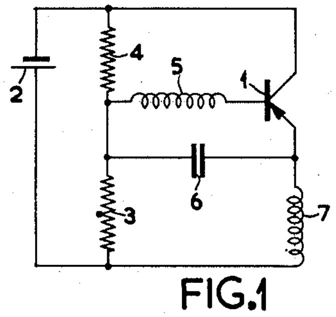
Fig. 1 is a schematic diagram of one embodiment of the amplifier of the present invention.

In Fig. 1, the transistor, which is preferably of junction type, and a source of supply voltage are indicated by 1 and 2, respectively. As is well-known, a transistor has the property that its workpoint adjusts itself to a different value when the temperature varies. In order to suppress said variations in workpoint, a resistor 3 having a high negative temperature coefficient is connected in series with another resistor 4 in parallel to the source of supply voltage 2. The junction of the two resistors 3 and 4 is connected via a signal source 5 to the base of the transistor and is connected via a capacitor 6, which passes to the signal frequencies, to the emitter of the transistor. Furthermore, a load 7 is included in the emitter circuit, that is, between the emitter and the associated terminal of the source of supply 2, said load having a considerable impedance not only for the signal frequencies, but also for direct current. The load 7 preferably comprises an inductive coil mounted on a magnetic core.

The emitter and the collector currents of the transistor 1 increase, with increasing temperature, resulting in the workpoint of the transistor tending to shift. However, said increase in current results in a greater voltage drop across the load 7. At the same time, the value of resistor 3 decreases as a result of the increase in temperature, so that the biasing potential between the base and the emitter is decreased for both reasons, resulting in the increase in current being counteracted. The capacitor 6 not only permits the full voltage of the signal source 5 to become active between said two electrodes, but also permits the load 7 to be included in the emitter circuit of transistor 1 without amplification loss.

A similar operation may be obtained when the resistor 4 has a positive temperature coefficient. At any rate, at least one of the two resistors 3 and 4 must have a considerable temperature coefficient.

Figure 2:
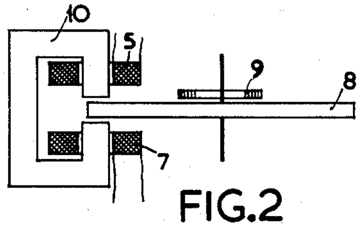
Fig. 2 is a schematic diagram of a device which may be utilized with the embodiment of Fig. 1.
Figure 3:
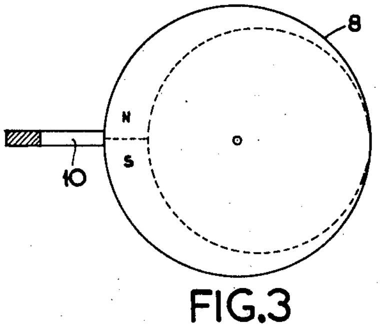
Fig. 3 is a top-view of a portion of the device of Fig. 2.

The invention is advantageously applicable to small electric apparatus, for example auditory apparatus. It is more particularly intended for use in an electric clockwork in which a small number of circuit elements is to be used on account of the small space available, as described in copending U. S. patent application, Serial No. 543,178. In the device of Figs. 2 and 3, the signal source 5 comprises a pick-up coil in which alternating voltages are induced by means of a permanent magnet 8 connected to the mechanical oscillating system, namely to the balance 9 of the clockwork, the load 7 being constituted by a driving coil maintaining the movement of the balance. The amplified currents traversing the coil 7 react upon the permanent magnet 8, thus bringing about the energy required for maintaining the mechanical oscillations of the balance. The coils 5 and 7 are provided on a single soft magnetic core 10, automatic self-excitation of the circuit 5, 1, 7 being avoided as a result of the input threshold voltage of the transistor.

While the invention has been described by means of a specific example and in a specific embodiment, I do not wish to be limited thereto, for obvious modifications will occur to those skilled in the art without departing from the spirit and scope of the invention.

What is claimed is:

1. A bias stabilized circuit arrangement comprising a transistor having emitter, collector and base electrodes, a source of supply voltage, a temperature dependent resistor, a second resistor connected in series arrangement with said temperature dependent resistor, said series arrangement being shunted across said source of supply voltage, a source of input signals connected between the base electrode of said transistor and the junction point of said temperature dependent resistor and said second resistor, a capacitor adapted to pass signals of signal frequency connected between the said junction point and the emitter electrode of said transistor, and a load impedance connected between said emitter electrode and the junction point of said temperature dependent resistor and said source of supply voltage, said load impedance having a substantial impedance for currents at said signal frequency and for direct currents.

2. A bias stabilized circuit arrangement comprising a transistor having emitter, collector and base electrodes and an emitter-base circuit, a source of supply voltage, a temperature dependent resistor having a negative temperature coefficient, a second resistor connected in series arrangement with said temperature dependent resistor, said series arrangement being shunted across said source of supply voltage, a source of input signals connected between the base electrode of said transistor and the junction point of said temperature dependent resistor and said second resistor, a capacitor adapted to pass signals of signal frequency connected between the said junction point and the emitter electrode of said transistor, and a load impedance connected between said emitter electrode and the junction point of said temperature dependent resistor and said source of supply voltage whereby said temperature dependent resistor is connected in series with said source of input signals and said load impedance in the emitter-base circuit of said transistor, said load impedance having a substantial impedance for currents at said signal frequency and for direct currents.

3. Apparatus for maintaining mechanical oscillations, comprising a magnetic core, a pickup coil mounted on said core, a permanent magnet rotatively mounted in operative relation to said pickup coil, means urging said magnet toward a zero position with respect to said pickup coil, said magnet having polarities so arranged with respect to said pickup coil that an electric pulse is produced by said coil each time said magnet passes through a point near said zero position, and means responsive to said pulses for exerting driving force pulses upon said magnet thereby to sustain said magnet in oscillatory motion relative to said pickup coil, said pulse responsive means comprising a driving coil mounted on said core in operative relation to said magnet and means for amplifying said electric pulses connected between the output of said pickup coil and the input of said driving coil, said amplifying means comprising a transistor having emitter, collector and base electrodes, a source of supply voltage, a temperature dependent resistor, a second resistor connected in series arrangement with said temperature dependent resistor, said series arrangement being shunted across said source of supply voltage, said pickup coil being connected between the base electrode of said transistor and the junction point of said temperature dependent resistor and said second resistor, and a capacitor adapted to pass signals of signal frequency connected between the said junction point and the emitter electrode of said transistor, said driving coil being connected between said emitter electrode and the junction point of said temperature dependent resistor and said source of supply voltage.

4. Apparatus for maintaining mechanical oscillations, comprising a magnetic core, a pickup coil mounted on said core, a permanent magnet rotatively mounted in operative relation to said pickup coil, means urging said magnet toward a zero position with respect to said pickup coil, said magnet having polarities so arranged with respect to said pickup coil that an electric pulse is produced by said coil each time said magnet passes through a point near said zero position, and means responsive to said pulses for exerting driving force pulses upon said magnet thereby to sustain said magnet in oscillatory motion relative to said pickup coil, said pulse responsive means comprising a driving coil mounted on said core in operative relation to said magnet and means for amplifying said electric pulses connected between the output of said pickup coil and the input of said driving coil, said amplifying means comprising a transistor having emitter, collector and base electrodes and an emitter-base circuit, a source of supply voltage, a temperature dependent resistor having a negative temperature coefficient, a second resistor connected in series arrangement with said temperature dependent resistor, said series arrangement being shunted across said source of supply voltage, said pickup coil being connected between the base electrode of said transistor and the junction point of said temperature dependent resistor and said second resistor, and a capacitor adapted to pass signals of signal frequency connected between the said junction point and the emitter electrode of said transistor, said driving coil being connected between said emitter electrode and the junction point of said temperature dependent resistor and said source of supply voltage whereby said temperature dependent resistor is connected in series with said pickup coil and said driving coil in the emitter-base circuit of said transistor.

References Cited in the file of this patent

UNITED STATES PATENTS 2,680,160 Yaeger ---------------- June 1, 1954

FOREIGN PATENTS 1,090,564 France ---------------- Oct. 20, 1954